(12) United States Patent
Zhou et al.

(10) Patent No.: US 7,508,173 B2
(45) Date of Patent: Mar. 24, 2009

(54) SYSTEM AND METHOD FOR PROVIDING REACTIVE POWER SUPPORT WITH DISTRIBUTED ENERGY RESOURCE INVERTER

(75) Inventors: Rui Zhou, Clifton Park, NY (US); Joseph Lucian Smolenski, Slingerlands, NY (US); Michael Richard Durling, Moreau, NY (US); William James Premerlani, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 439 days.

(21) Appl. No.: 11/297,755

(22) Filed: Dec. 8, 2005

(65) Prior Publication Data

US 2007/0135970 A1    Jun. 14, 2007

(51) Int. Cl.
    *G05F 1/70* (2006.01)
(52) U.S. Cl. ............................. 323/207; 323/205
(58) Field of Classification Search ............. 323/205, 323/207; 363/95, 97, 131; 307/12, 16, 30, 307/31, 35, 38, 39
    See application file for complete search history.

(56) References Cited

U.S. PATENT DOCUMENTS

| | | | |
|---|---|---|---|
| 4,547,726 A | 10/1985 | Premerlani | |
| 4,715,000 A | 12/1987 | Premerlani | |
| 4,723,216 A | 2/1988 | Premerlani | |
| 5,844,327 A * | 12/1998 | Batson | 307/64 |
| 6,141,196 A | 10/2000 | Premerlani et al. | |
| 6,697,951 B1 * | 2/2004 | Sinha et al. | 713/300 |
| 6,927,695 B2 * | 8/2005 | Hayden | 340/657 |

* cited by examiner

*Primary Examiner*—Matthew V Nguyen
(74) *Attorney, Agent, or Firm*—Ann M. Agosti

(57) ABSTRACT

A reactive power compensation system includes a distributed energy resource situated at a local location configured to also receive power from a remote location by a distribution feeder line. The distributed energy resource includes an inverter including power semiconductor switching devices and an inverter controller configured for controlling the power semiconductor switching devices so as to provide reactive power support to the distribution feeder line.

24 Claims, 8 Drawing Sheets

SYSTEM AND METHOD FOR PROVIDING REACTIVE POWER SUPPORT WITH DISTRIBUTED ENERGY RESOURCE INVERTER

BACKGROUND

The invention relates generally to distributed energy resources.

Electric power is delivered to residential consumers through power distribution systems that typically have radial topologies. In such power distribution systems, feeders branch out from a substation and reach a residential consumer through a step down transformer. Conventional power flow in such axial embodiments is unidirectional from the substation to the residence.

In a typical radial distribution system, voltage sag (drop) along the feeder is proportional to the reactive power on the feeder according to the formula:

$$\Delta V = \frac{PR + QX}{V},$$

wherein $\Delta V$ is the voltage drop, P, Q are the real and reactive power, V is the bus voltage; and R, X are feeder resistance and reactance respectively. The resistance R of the feeder line is typically orders of magnitude smaller than the reactance X. Therefore, the voltage drop on the feeder line can be depicted approximately as follows.

$$\Delta V \approx \frac{QX}{V}.$$

For a long feeder line, voltage sag emerges as a significant issue when the reactive load is heavy. One proposed approach to solve the problem is to install capacitor banks at the substation or at pole top capacitors along the feeder line. The theory is that the capacitance load will offset the reactive power consumption on the feeder and that the voltage level at the end of the long feeder can thus be restored. However, this approach often requires extra capital expenditure by the utility. In addition, the capacitor banks are typically switched on and off incrementally. Therefore, continuous coverage of the reactive power compensation can be a challenge.

With emerging distributed energy resources such as residential photovoltaic (PV) systems bi-directionality is becoming more important. As distributed energy resources have increased presence in power distribution systems, advanced functions will be useful to leverage these assets. One such functionality which would be desirable is reactive power (or VAR) support.

BRIEF DESCRIPTION

In accordance with one embodiment of the present invention, a reactive power compensation system comprises a distributed energy resource situated at a local location configured to also receive power from a remote location by a distribution feeder line. The distributed energy resource comprises an inverter comprising power semiconductor switching devices and an inverter controller configured for controlling the power semiconductor switching devices so as to provide reactive power support to the distribution feeder line.

In accordance with another embodiment of the present invention, a reactive power compensation method comprises (a) providing a distributed energy resource at a local location configured to also receive power from a remote location by a distribution feeder line and (b) using an inverter of the distributed energy resource to provide reactive power support to the distribution feeder line.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
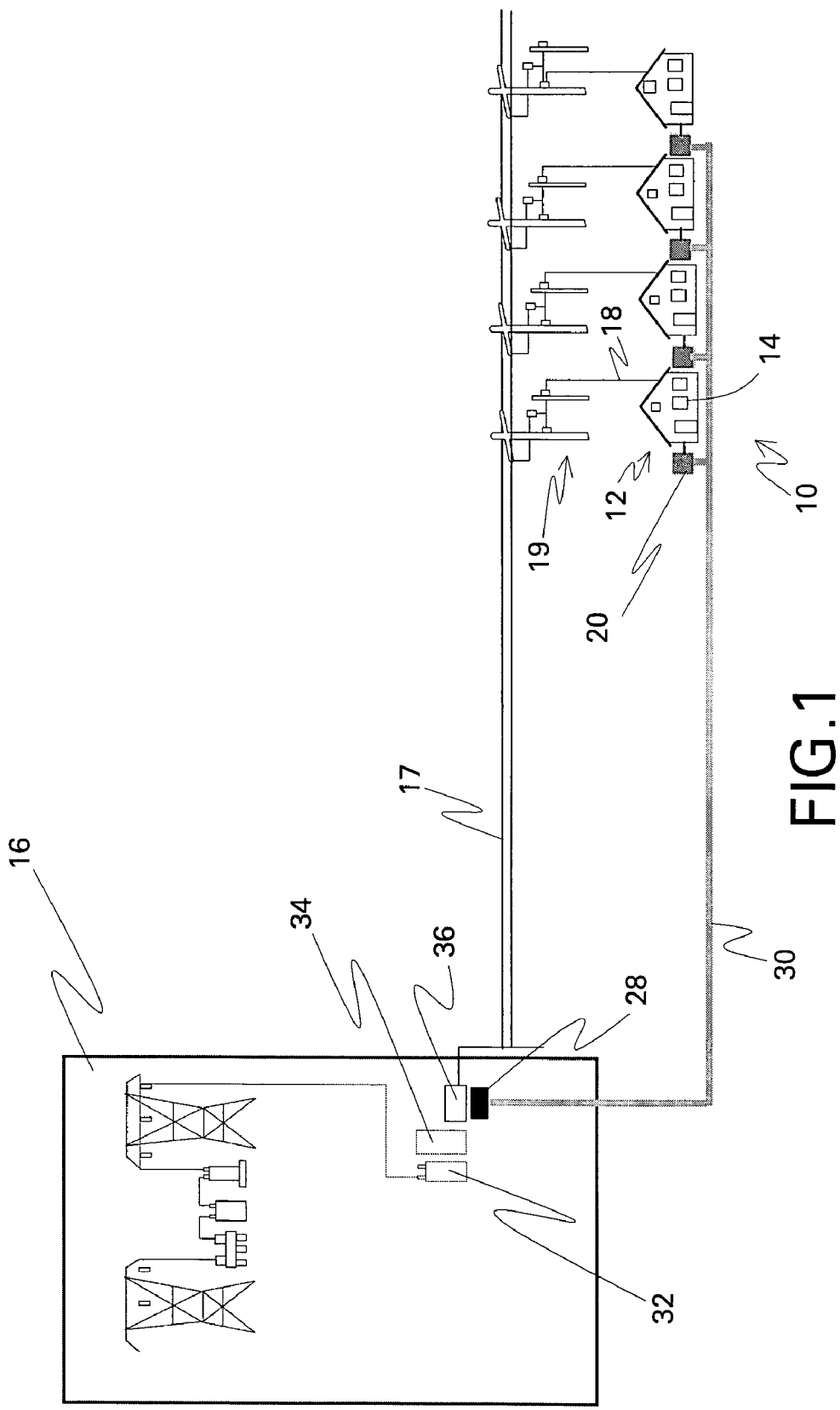
FIG. 1 is a schematic diagram of a reactive power compensation system in accordance with one embodiment of the present invention.
Figure 4:
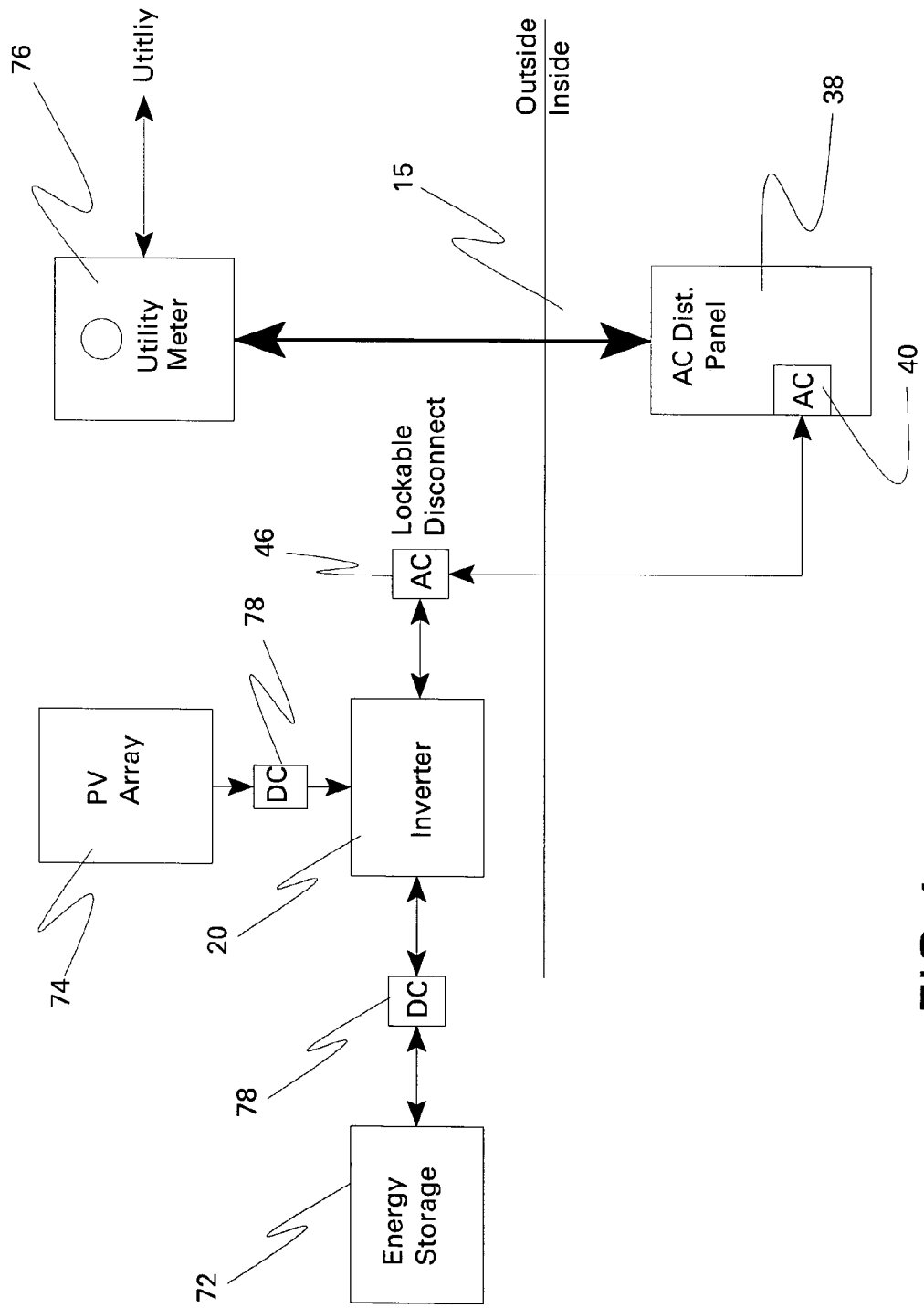
FIG. 4 is a schematic diagram of a reactive power compensation system in accordance with another more specific embodiment of the present invention.
Figure 5:
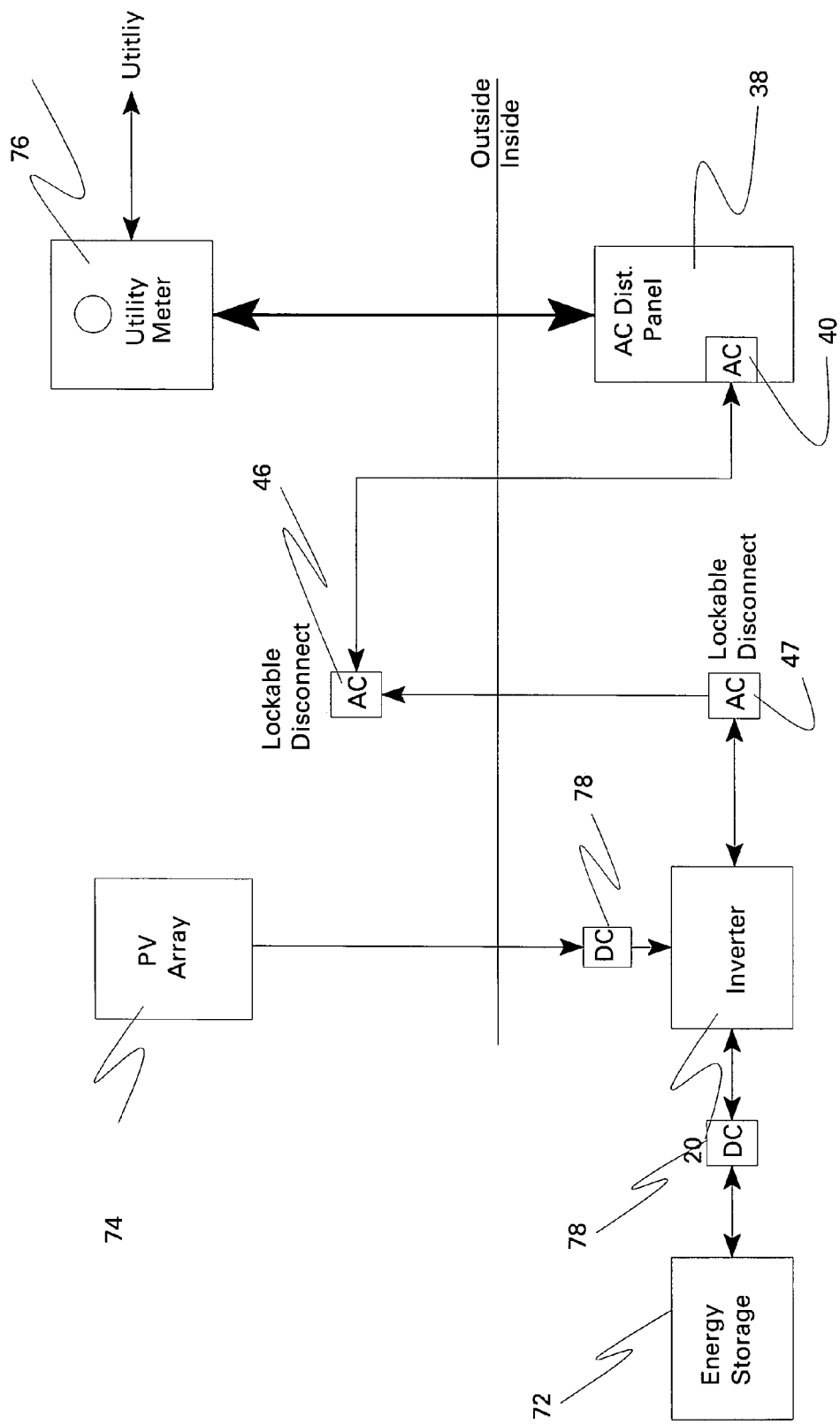
FIG. 5 is a schematic diagram of a reactive power compensation system in accordance with another more specific embodiment of the present invention.
Figure 6:
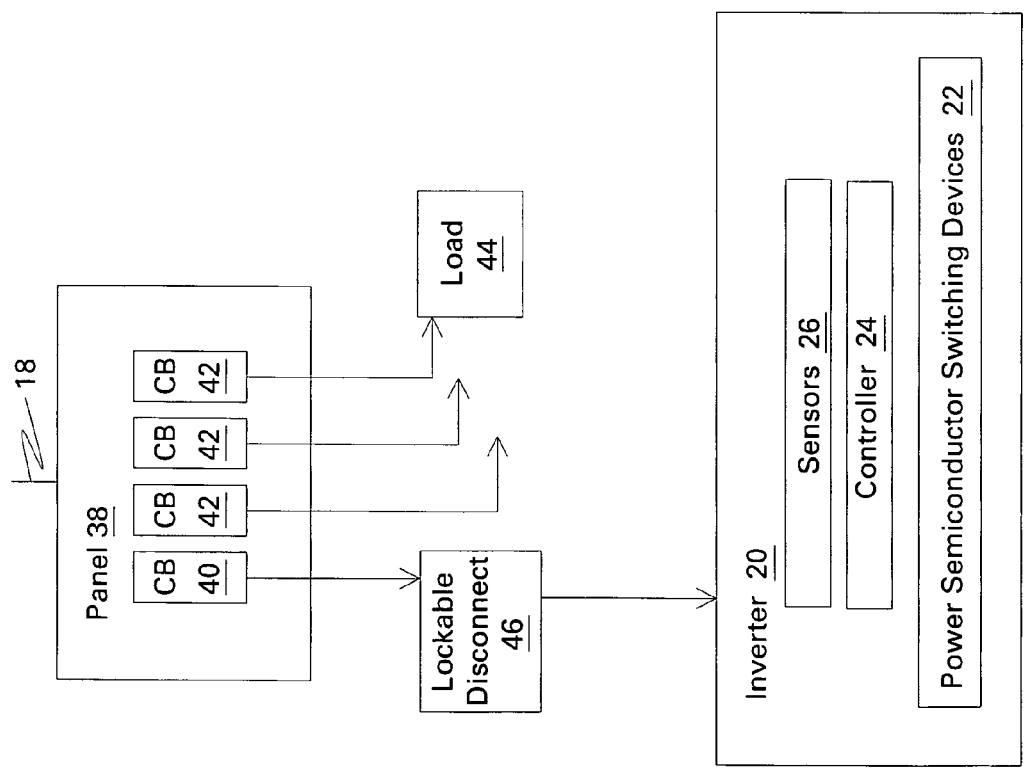
FIG. 6 is a schematic diagram of switches between a load, a grid, and an inverter in accordance with another embodiment of the present invention.

FIG. 1 is a schematic diagram of a reactive power compensation system in accordance with one embodiment of the present invention, FIGS. 2-5 are diagrams of more specific photovoltaic system embodiments, and FIG. 6 is a schematic diagram of switches between a load, a grid, and an inverter in accordance with another embodiment of the present invention. In the embodiment shown in FIGS. 1 and 6, a reactive power compensation system 10 comprises a distributed energy resource 12 situated at a local location 14 that is configured to also receive power from a remote location 16 by a distribution feeder line 18. Distributed energy resource 12 comprises an inverter 20 comprising power semiconductor switching devices 22 and an inverter controller 24 configured for controlling power semiconductor switching devices 22 so as to provide reactive power support to distribution feeder line 18.

FIG. 1 additionally illustrates an embodiment wherein remote location 16 comprises a substation which further comprises a substation transformer 32 coupled via a substation circuit breaker 34 and wherein a feeder 17 couples power from remote location 16 to distribution feeder lines 18 through step down transformers 19. FIG. 1 additionally illustrates optional parameter sensors 36, distribution management system 28, and communication link 30.

Figure 2:
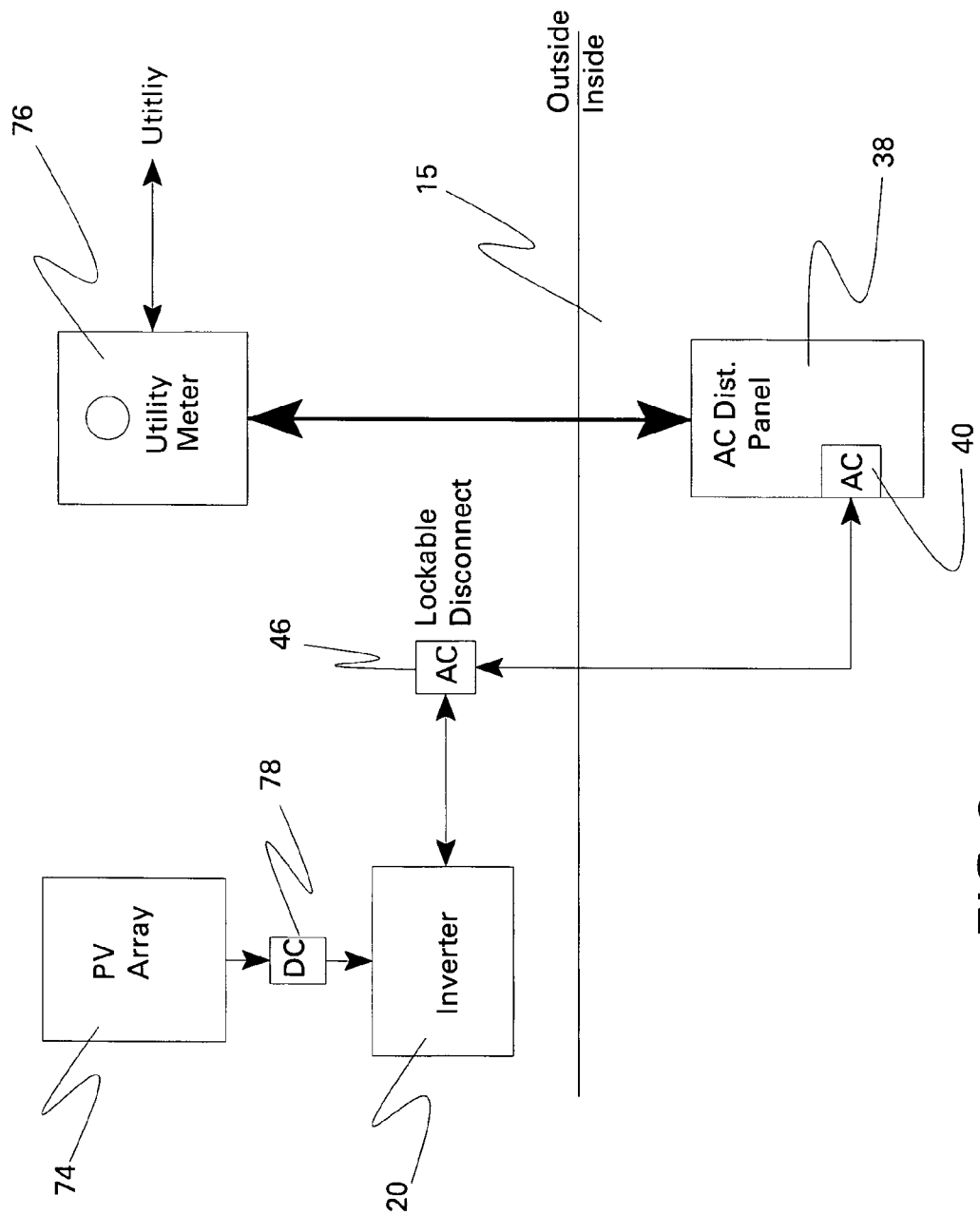
FIG. 2 is a schematic diagram of a reactive power compensation system in accordance with a more specific embodiment of the present invention.

In one embodiment distributed energy resource 12 comprises a photovoltaic system including a photovoltaic array 74 (shown in FIG. 2). A conventional roof-mounted photovoltaic system typically includes a photovoltaic panel (not shown), a photovoltaic inverter (shown by element 20 in FIGS. 1 and 6), a lockable disconnect (shown by element 46 in FIG. 6), such as a circuit breaker or transfer switch, to connect and disconnect the inverter from the feeder line, and optional other features with one example being a temperature control system (not shown). Although a photovoltaic system is used for purposes of example, the present invention is not limited to photovoltaic systems. Other distributed energy resources 12 that include inverters may alternatively or additionally be used. Several examples include wind turbines, batteries, and energy storage devices. Local location 14 may comprise a residence or commercial establishment, for example.

Figure 3:
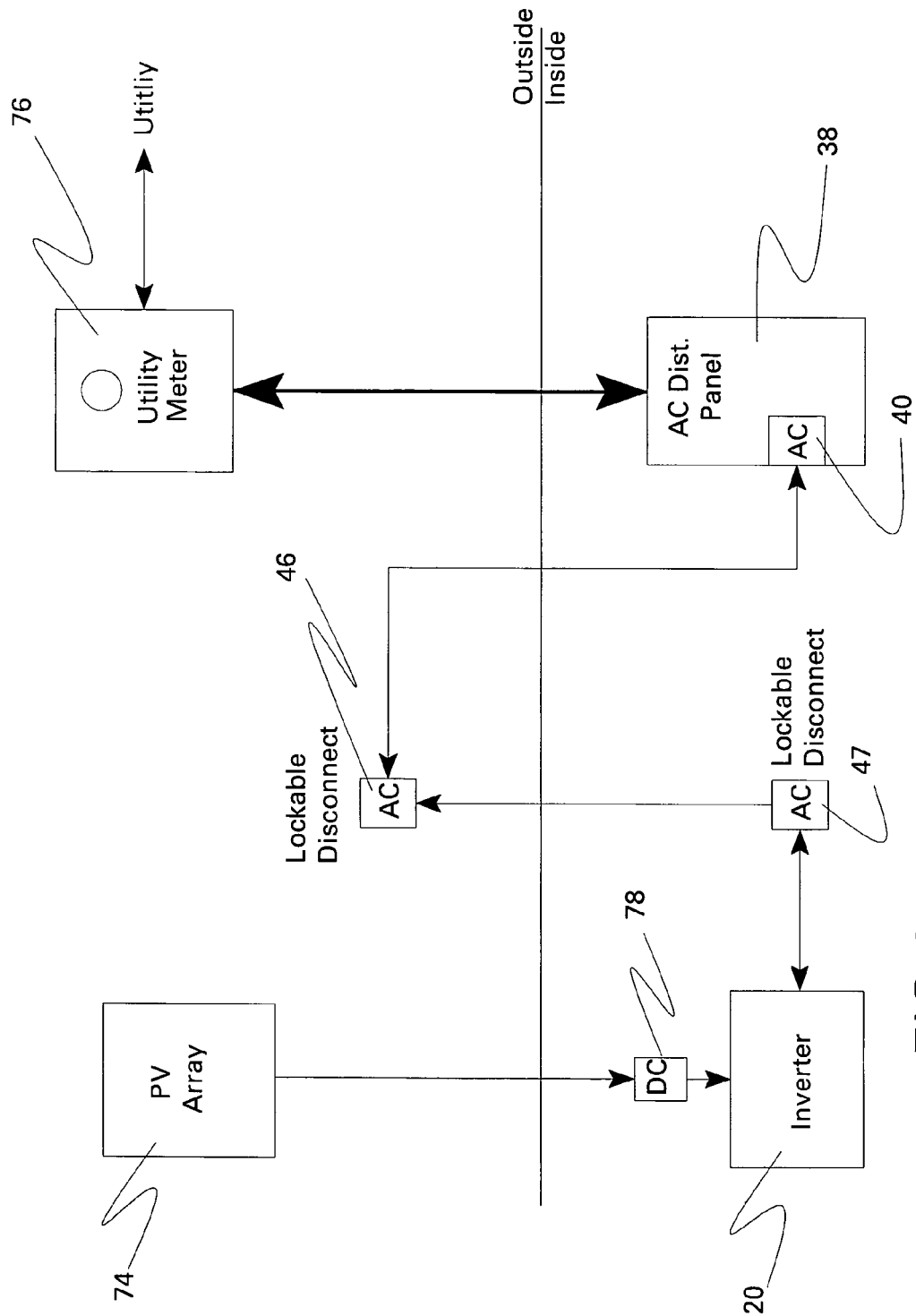
FIG. 3 is a schematic diagram of a reactive power compensation system in accordance with another more specific embodiment of the present invention.

The embodiments of FIGS. 2-5 illustrate examples of several photovoltaic system embodiments. In the embodiment of FIG. 2, local location 14 comprises a building 15, and photovoltaic array 74 and inverter 20 are situated outside the building. FIG. 2 additionally illustrates a utility meter 76 coupled to a distribution panel 38 including a circuit breaker 40. Further illustrated are a lockable disconnect 46 and a DC disconnect switch 78. Lockable disconnect 46 is shown as being situated outside of building 15 and as coupling inverter 20 to distribution panel 38. The embodiment of FIG. 3 is similar to that of FIG. 2 except that inverter 20 is situated inside of building 15. Optionally an additional lockable disconnect 47 is situated inside of the building and couples lockable disconnect 46 to distribution panel 38. The embodiment of FIG. 4 is similar to that of FIG. 2 with the addition of an energy storage device 72 configured for supplying power to inverter 20 when power from the photovoltaic system is insufficient to meet building load demands. The embodiment of FIG. 5 is similar to the embodiment of FIG. 3 with the addition of energy storage device 72.

Referring again to FIG. 6, inverter 20 typically includes hardware switches (such as power semiconductor switching devices), hardware control elements which execute control algorithms, and sensors for parameters such as voltage, current, and temperature. In one local control type embodiment, inverter 20 comprises a sensor 26 configured for sensing voltage on the feeder line, and inverter controller 24 is further configured for using the sensed voltage to calculate an inverter output voltage adjustment designed to provide the reactive power support. In local control type embodiments, the inverter monitors voltage and adjusts VAR generation to attempt to maintain voltage stability. For example, in one embodiment, if voltage is expected to be 110 volts but is measured as 105 volts, inverter 20 will incrementally add negative VAR, obtain more voltage measurements, and continue adjusting VAR until the measured voltage moves returns to 110 volts.

In another embodiment a distribution management system 28 (FIG. 1) is configured for providing a reactive power command, and a communication link 30 is configured for providing the reactive power command to inverter 20. In a more specific embodiment, distributed energy resource 12 comprises a plurality of distributed energy resources, and distribution management 28 system is configured for providing a plurality of respective reactive power commands.

Communication link 30 may comprise either a unidirectional (from distribution management system 28 to inverter) or a bi-directional communication link. Communication link 30 may be selected from links such as telephone lines, cable modems, wireless networks, and power line carriers for example.

Whether a unidirectional or bi-directional communication is used, in multiple distributed energy resource embodiments, distribution management system 28 may be further configured for establishing the plurality of reactive power commands to respective inverters. In one embodiment, distribution management system 28 establishes the commands by using information about voltage sensed on feeder 17, the impedance on feeder 17, how many inverters 20 are on the feeder, and the inverter capacity. In bi-directional embodiments information about which inverters are in an "on" state is additionally useful for distribution management system 28. In one such embodiment, the inverters each supply an operational status signal to the distribution management system. Other signals which may optionally be supplied include amount of VAR being generated (actual capacity), voltage at the inverter connection, and current at the inverter connection. If inverters 20 provide feedback to distribution management system 28, distribution management system 28 can optimize the reactive power commands. For example, if one inverter is down, distribution management system 28 can calculate the commands based on the reduced number of inverters.

FIG. 6 additionally illustrates a distribution panel 38 with a plurality of circuit breakers. Circuit breaker 40, in one embodiment, is coupled through lockable disconnect 46 to inverter 20. Circuit breakers 42 are coupled to other appropriate loads 44, for example. When circuit breaker 42 and lockable disconnect 46 are "on" such that inverter 20 can be used in a way to act as a capacitor for VAR support, the voltage level of feeder 17 can be maintained and capacitor banks at remote location 16 (shown as a substation in FIG. 1) can be reduced and sometimes eliminated.

Figure 7:
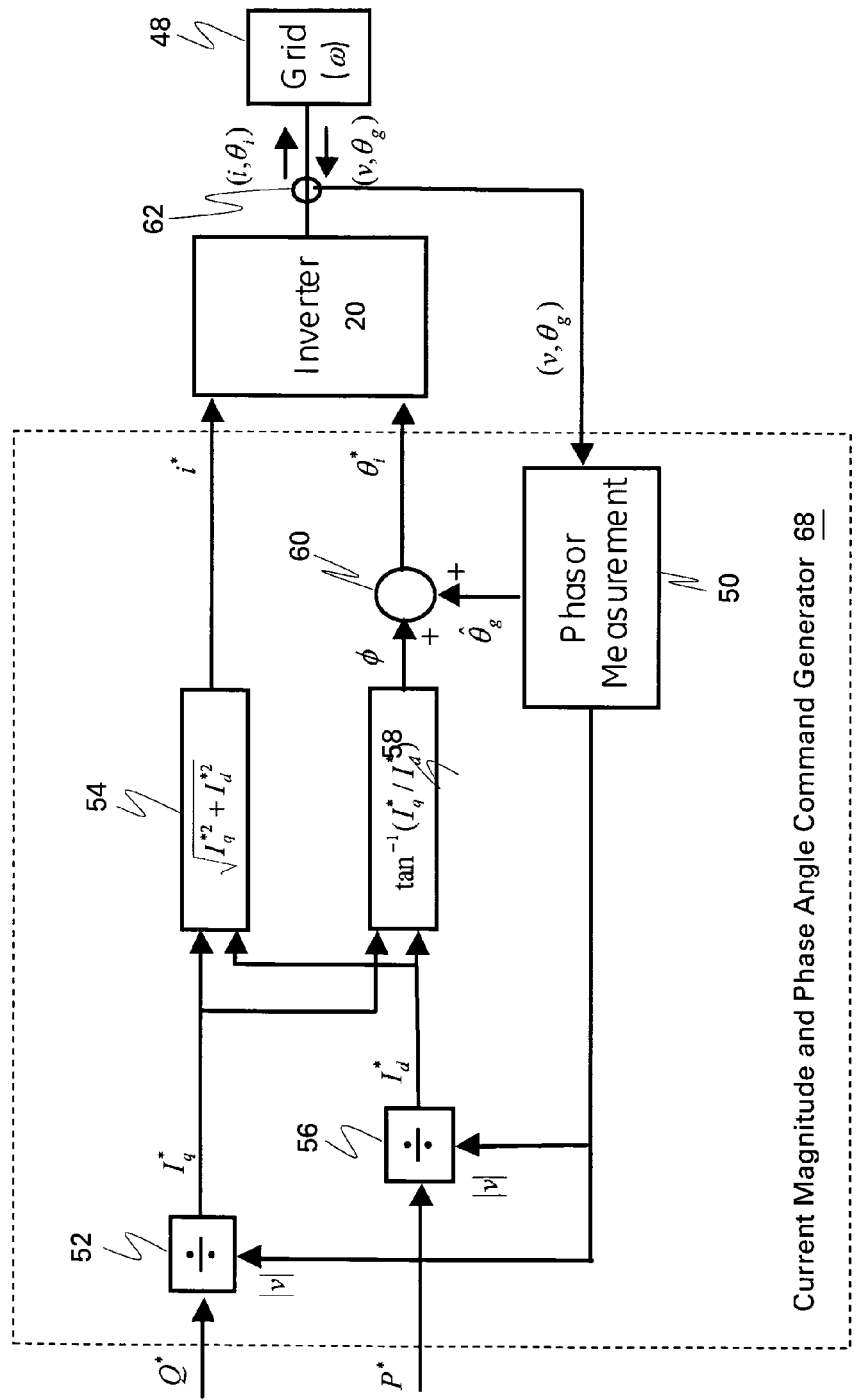
FIG. 7 is a block diagram of an inverter control algorithm in accordance with another embodiment of the present invention.

FIG. 7 is a block diagram of an inverter control algorithm in accordance with another embodiment of the present invention wherein compensation system 10 is further configured with a processor (shown as current and phase angle command generator 68 in FIG. 7 for purposes of example) for: using instantaneous feeder line voltage and phase angle measurements to obtain a voltage phasor magnitude and an estimated voltage phase (at phasor measurement block 50); dividing a reactive power command Q* by the voltage phasor magnitude to obtain a reactive current command $I_q^*$ (at divider 52); dividing a real power command P* by the voltage phasor magnitude to obtain a real current command $I_d^*$ (at divider 56); calculating an inverter current magnitude command i* from the reactive current command and the real current command (at conversion function 54); calculating an estimated current phase from the reactive current command and the real current command (at conversion function 58); and adding the estimated current phase $\phi$ to the estimated voltage phase $\theta_g$ (at summation element 60) to obtain an inverter current phase angle command $\theta_i^*$. Feeder line voltage measurements are typically raw data measurements from sensor 62 of instantaneous voltage (v) and phase ($\theta_g$) on the phase lines between inverter 20 and grid 48. Processor 68 may be situated either within inverter controller 24 of inverter 20 or outside of inverter 20. In either embodiment of FIG. 7, inverter controller 24 uses the inverter current magnitude command i* and the inverter current phase angle command $\theta_i^*$ to set the commutation commands for inverter power semiconductor switching devices 22 (FIG. 6).

In the example of FIG. 7, conversion function 54 obtains the inverter current magnitude command i* by taking the square root of the sum of the squares of the real and reactive current commands, and conversion function 58 obtains the estimated current phase by obtaining the inverse tangent of the reactive current command divided by the real current command.

Any one of a number of appropriate techniques may be used at phasor measurement block 50. For example, voltage may be estimated by the following equation:

$$\overline{V} = \frac{\sqrt{2}}{N} \sum_{k=-\frac{N}{2}}^{\frac{N}{2}-1} v[(k+1/2) \cdot \Delta t] \cdot e^{-j(k+1/2)\frac{2\pi}{N}}$$

wherein $\overline{V}$ represents the voltage phasor estimate, N represents the number of samples per cycle, $$\Delta t = \frac{2\pi}{N \cdot \omega}$$

and represents the sampling time step; and ω represents the power system nominal frequency (which is 377 radians per second in the United States).

During off-nominal power system frequency events, the "true" phasor may be derived from the phasor estimate with the relationship between the two being expressed by the following three equations:

$$\overline{V} = A \cdot V + B \cdot V^*,$$

$$A = \frac{\sin(\pi \cdot \Delta\omega/\omega)}{N \cdot \sin\left(\frac{\pi}{N} \cdot \Delta\omega/\omega\right)}, \text{ and}$$

$$B = \frac{\sin(\pi \cdot \Delta\omega/\omega)}{N \cdot \sin\left(2\frac{\pi}{N} + \frac{\pi}{N} \cdot \Delta\omega/\omega\right)}$$

wherein V represents the actual voltage phasor value, V* represents the conjugate of the actual voltage phasor, A and B represent compensation coefficients, $\Delta\omega = \omega_g - \omega$ and represents the frequency deviation, and $\omega_g$ represents the actual frequency of the power distribution system.

By rearranging the above equations, the following equations can be derived:

$$V = C \cdot \overline{V} - D \cdot \overline{V}^*,$$

$$C = \frac{A}{A^2 - B^2}, \text{ and}$$

$$D = \frac{B}{A^2 - B^2}$$

wherein C and D represent compensation coefficients which can be approximated via a Taylor expansion such as the following $$C \approx 1 + \left(\frac{1}{6} \cdot \pi^2 + \frac{1}{4}\right) \cdot (\Delta\omega/\omega)^2$$

$$D \approx \frac{1}{2} \cdot \Delta\omega/\omega - \frac{1}{4} \cdot (\Delta\omega/\omega)^2.$$

Thus, the voltage magnitude and phase angle may be derived if the frequency of the power distribution system is known and, in one embodiment, processor 68 is configured for using a power distribution system frequency in addition to the instantaneous feeder line voltage and phase angle signals to obtain the voltage phasor magnitude and the estimated voltage phase.

In embodiments wherein distribution management system 28 is used, distribution management system 28 may measure the frequency of the power system with sensors 36 (FIG. 1), for example, and supply the power system frequency value through communication link 30. In other embodiments or, if desired in distribution management system embodiments, the power system frequency may be derived.

One way to derive the power system frequency is to use two consecutive voltage phasor estimates. In this embodiment, the voltage phase estimate is calculated every half cycle as follows:

$$\overline{V}(m) = \frac{\sqrt{2}}{N} \sum_{k=m\frac{N}{2}-\frac{N}{2}}^{m\frac{N}{2}+\frac{N}{2}-1} v[(k+1/2) \cdot \Delta t] \cdot e^{-j(k-m\frac{N}{2}+1/2)\frac{2\pi}{N}}$$

wherein m represents the half cycle index. The frequency estimation is derived as:

$$E(m) = \overline{V}(m) \cdot \overline{V}(m-1)^*,$$

$$\overline{\omega}_g(m) = \omega + \frac{\omega}{\pi} \cdot \tan^{-1}\left(\frac{\text{Im}(E(m))}{\text{Re}(E(m))}\right)$$

wherein $\overline{\omega}_g$ represents the frequency estimate. The phase measurement is then compensated as follows:

$$\Delta\omega(m) = \overline{\omega}_g(m) - \omega$$

$$V(m) = \left[1 + \left(\frac{1}{6} \cdot \pi^2 + \frac{1}{4}\right) \cdot (\Delta\omega(m)/\omega)^2\right] \cdot$$

$$\overline{V}(m) - \left[\frac{1}{2} \cdot \Delta\omega(m)/\omega - \frac{1}{4} \cdot (\Delta\omega(m)/\omega)^2\right] \cdot \overline{V} \cdot (m)^*$$

From there, the voltage magnitude |v| and phase angle $\overline{\omega}_g$ are calculated:

$$|v| = \sqrt{\text{Im}(V(m))^2 + \text{Re}(V(m))^2}$$

$$\hat{\theta}_g = \tan^{-1}\left(\frac{\text{Im}(V(m))}{\text{Re}(V(m))}\right).$$

The phase angle is calculated with reference to the sampling frame and, in this example, is only updated every half cycle (for United States power applications, this is typically every 8 milliseconds). In order to use the phase angle in the inverter reactive power control, in one embodiment, a precise time instance is selected for calculating the phase angle. In another embodiment, the phase angle is calculated and used in combination with the power system frequency to derive the phase angles in between the calculated phase angles.

Figure 8:
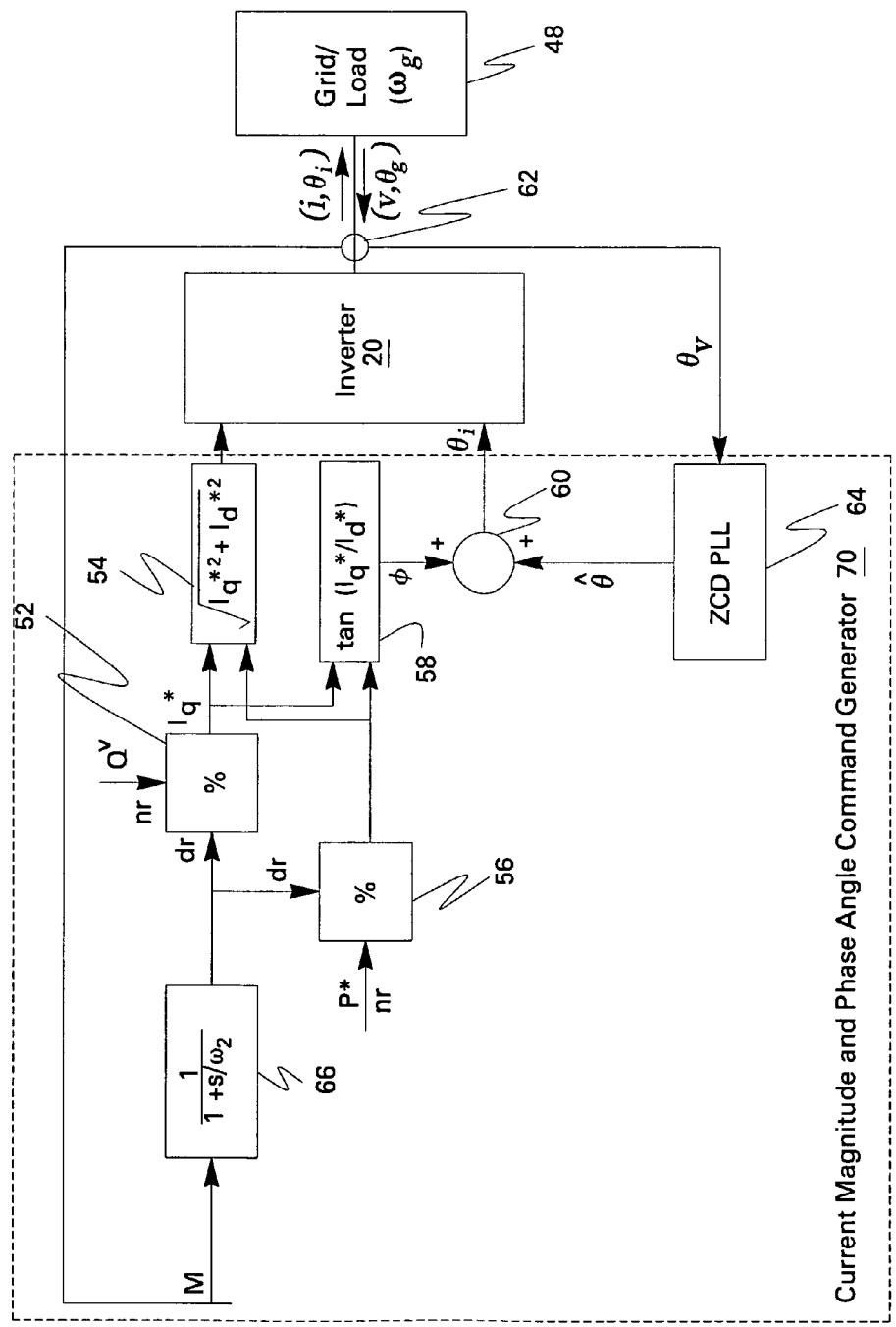
FIG. 8 is a block diagram of an inverter control algorithm element in accordance with another embodiment of the present invention.

FIG. 8 is a block diagram of an inverter control algorithm element in accordance with another embodiment of the present invention which is similar to the embodiment of FIG. 7 except that a zero crossing detection phase locked loop is used instead of a phasor measurement block to obtain estimated voltage phase $\hat{\theta}$. The voltage phasor magnitude in the embodiment of FIG. 8 is obtained from the instantaneous voltage obtained from sensor 62 at the peak voltage phase angles $$(\hat{\theta} = \pm \frac{\pi}{2}).$$

More specifically, in the embodiment of FIG. 8, processor 70 comprises: a low pass filter 66 for obtaining a voltage phasor magnitude estimate from an instantaneous feeder line voltage measurement; a phase locked loop for obtaining an estimated voltage phase from an instantaneous feeder line voltage phase angle measurement; a divider 52 for dividing the reactive power command by the voltage phasor magnitude to obtain a reactive current command; a divider 54 for dividing a real power command by the voltage phasor magnitude to obtain a real current command; a current magnitude command calculator 54 for calculating an inverter current magnitude command from the reactive current command and the real current command; a current phase command calculator 58 for calculating an estimated current phase from the reactive current command and the real current command; and a summation element 60 for adding the estimated current phase to the estimated voltage phase to obtain an inverter current phase angle command.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A reactive power compensation system comprising:
a distributed energy resource situated at a local location, the local location being configured to also receive power from a remote location by a distribution feeder line, the distributed energy resource comprising an inverter;
wherein the inverter comprises power semiconductor switching devices and an inverter controller configured for controlling the power semiconductor switching devices so as to provide reactive power support to the distribution feeder line; and
a distribution management system configured for providing a reactive power command and a communication link configured for providing the reactive power command to the inverter such that reactive power is adjusted in a predetermined manner to maintain voltage stability associated with the distribution feeder line.

2. The compensation system of claim 1 wherein the inverter further comprises a sensor configured for sensing voltage on the feeder line, and wherein the inverter controller is further configured for using the sensed voltage to calculate an inverter output voltage adjustment designed to provide the reactive power support.

3. The compensation system of claim 1 wherein the distributed energy resource comprises a plurality of distributed energy resources, and wherein the distribution management system is configured for providing a plurality of respective reactive power commands.

4. The compensation system of claim 3 wherein the communication link comprises a unidirectional communication link.

5. The compensation system of claim 3 wherein the distribution management system is further configured for establishing the plurality of reactive power commands.

6. The compensation system of claim 5 wherein the communication link comprises a bi-directional communication link.

7. The compensation system of claim 6 wherein the inverters each are configured to supply an operational status signal to the distribution management system.

8. The compensation system of claim 7 wherein the distribution management system is further configured for using the operational status signals to establish the plurality of reactive power commands.

9. The compensation system of claim 1 wherein the compensation system is further configured with a processor for:
using instantaneous feeder line voltage and phase angle measurements to obtain a voltage phasor magnitude and an estimated voltage phase;
dividing the reactive power command by the voltage phasor magnitude to obtain a reactive current command;
dividing a real power command by the voltage phasor magnitude to obtain a real current command;
calculating an inverter current magnitude command from the reactive current command and the real current command;
calculating an estimated current phase from the reactive current command and the real current command;
adding the estimated current phase to the estimated voltage phase to obtain an inverter current phase angle command.

10. The compensation system of claim 9 wherein the inverter controller comprises the processor.

11. The compensation system of claim 9 wherein the processor is situated outside of the inverter.

12. The compensation system of claim 9 further comprising a distribution management system configured for providing a reactive power command and a communication link configured for providing the reactive power command to the inverter, and wherein the processor is further configured for using a power distribution system frequency in addition to the instantaneous feeder line voltage and phase angle signals to obtain the voltage phasor magnitude and the estimated voltage phase.

13. The compensation system of claim 12 wherein the distribution management system is configured to supply the power distribution system frequency to the inverter controller through the communication link.

14. The compensation system of claim 12 wherein the inverter controller is further configured to derive the power system frequency using two consecutive voltage phasor estimates.

15. The compensation system of claim 1 further comprising
a low pass filter for obtaining a voltage phasor magnitude estimate from an instantaneous feeder line voltage measurement;
a phase locked loop for obtaining an estimated voltage phase from an instantaneous feeder line voltage phase angle measurement;
a divider for dividing the reactive power command by the voltage phasor magnitude to obtain a reactive current command;
a divider for dividing a real power command by the voltage phasor magnitude to obtain a real current command;

a current magnitude command calculator for calculating an inverter current magnitude command from the reactive current command and the real current command;

a current phase command calculator for calculating an estimated current phase from the reactive current command and the real current command;

a summation element for adding the estimated current phase to the estimated voltage phase to obtain an inverter current phase angle command.

16. The compensation system of claim 1 wherein the distributed energy resource comprises a photovoltaic system comprising a photovoltaic array.

17. The compensation system of claim 16 wherein the local location comprises a building and wherein the photovoltaic array and the inverter are situated outside the building.

18. The compensation system of claim 17 further comprising a distribution panel and a lockable disconnect, wherein the lockable disconnect is situated outside of the building and configured for coupling to inverter to the distribution panel.

19. The compensation system of claim 16 wherein the local location comprises a building, and wherein the inverter is situated inside to building.

20. The compensation system of claim 19 further comprising a distribution panel and a lockable disconnect wherein the lockable disconnect is situated outside of the building and configured for coupling the inverter to the distribution panel.

21. The compensation system of claim 20 further comprising an additional lockable disconnect situated inside of the building and configured for coupling the lockable disconnect to the distribution panel.

22. The compensation system of claim 16 wherein the local location comprises a building, wherein the photovoltaic array and the inverter are situated outside the building; and further comprising an energy storage device configured for supplying power to the inverter when power from the photovoltaic system is insufficient to meet building load demands.

23. The compensation system of claim 16 wherein the local location comprises a building, wherein the inverter is situated inside the building; and further comprising an energy storage device configured for supplying power to the inverter when power from the photovoltaic system is insufficient to meet building load demands.

24. A reactive power compensation method comprising:
providing a distributed energy resource at a local location configured to also receive power from a remote location by a distribution feeder line, the distributed energy resource comprising an inverter; and using the inverter to provide reactive power support to the distribution feeder line such that reactive power is adjusted in a predetermined manner to maintain voltage stability associated with the distribution feeder line.

* * * * *